US012372036B2

(12) United States Patent
Weber et al.

(10) Patent No.: US 12,372,036 B2
(45) Date of Patent: Jul. 29, 2025

(54) RECIPROCATING PISTON ENGINE, AND METHOD FOR OPERATING A RECIPROCATING PISTON ENGINE

(71) Applicant: Schaeffler Technologies AG & Co. KG, Herzogenaurach (DE)

(72) Inventors: Juergen Weber, Erlangen (DE); Thomas Werblinski, Fürth (DE); Thomas Rasche, Heßdorf (DE); Korbinian Taubeneder, Nuremberg (DE); Alexander Matzkowitz, Burgthann (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/729,519

(22) PCT Filed: Jan. 19, 2023

(86) PCT No.: PCT/DE2023/100037
§ 371 (c)(1),
(2) Date: Jul. 17, 2024

(87) PCT Pub. No.: WO2023/151742
PCT Pub. Date: Aug. 17, 2023

(65) Prior Publication Data
US 2025/0154908 A1 May 15, 2025

(30) Foreign Application Priority Data
Feb. 8, 2022 (DE) ..................... 10 2022 102 837.2

(51) Int. Cl.
*F02D 13/02* (2006.01)
*F01L 13/00* (2006.01)
(Continued)

(52) U.S. Cl.
CPC .......... *F02D 13/0219* (2013.01); *F01L 13/00* (2013.01); *F02D 13/0215* (2013.01); *F02D 13/0234* (2013.01); *F02D 13/0238* (2013.01); *F02D 29/02* (2013.01); *F02D 41/042* (2013.01); *F02D 41/062* (2013.01)

(58) Field of Classification Search
CPC .. F02D 41/042; F02D 41/062; F02D 13/0219; F02D 13/0215; F02D 13/0234; F02D 13/0238; F02D 29/02; F01L 13/00
See application file for complete search history.

(56) References Cited

FOREIGN PATENT DOCUMENTS

| | | | |
|---|---|---|---|
| DE | 10160819 | A1 | 6/2003 |
| DE | 102008050824 | A1 | 4/2010 |

(Continued)

*Primary Examiner* — Ngoc T Nguyen
(74) *Attorney, Agent, or Firm* — Matthew V. Evans

(57) ABSTRACT

The disclosure relates to a method for operating a reciprocating piston engine having a valve controller, the method comprising five operating phases (Ph1, Ph2, Ph3, Ph4, Ph5), namely a regular combustion engine operation (Ph1), an overrun operation (Ph2), a shutdown process (Ph3), a restart (Ph4), as well as a transition back to the combustion engine operation (Ph5). During the transition to the overrun operation, a drag torque of the reciprocating piston engine is reduced by adjusting the valve controller. During the shutdown, the drag torque is increased. In the course of the restart that interrupts the shutdown process, the drag torque is temporarily reduced.

19 Claims, 4 Drawing Sheets

(51) Int. Cl.

| | |
|---|---|
| ***F02D 29/02*** | (2006.01) |
| ***F02D 41/04*** | (2006.01) |
| ***F02D 41/06*** | (2006.01) |

(56) References Cited

FOREIGN PATENT DOCUMENTS

| | | | |
|---|---|---|---|
| DE | 102011087891 | A1 | 6/2013 |
| DE | 102013202196 | A1 | 8/2014 |
| DE | 102014224925 | A1 | 6/2016 |
| DE | 102016216116 | A1 | 3/2018 |
| DE | 102017101792 | B4 | 11/2018 |
| DE | 102018109539 | B3 | 10/2019 |
| DE | 102019107775 | A1 | 6/2020 |
| DE | 102019005128 | A1 | 1/2021 |
| DE | 102021102364 | A1 | 8/2022 |

RECIPROCATING PISTON ENGINE, AND METHOD FOR OPERATING A RECIPROCATING PISTON ENGINE

CROSS-REFERENCE TO RELATED APPLICATIONS

This application is the U.S. National Phase of PCT Application No. PCT/DE2023/100037 filed on Jan. 19, 2023, which claims priority to DE 10 2022 102 837.2 filed on Feb. 8, 2022, the entire disclosures of which are incorporated by reference herein.

TECHNICAL FIELD

The disclosure relates to a method for operating a reciprocating piston engine. Furthermore, the disclosure relates to a reciprocating piston engine which has a valve controller with variable control times.

BACKGROUND

DE 10 2013 202 196 A1 discloses an internal combustion engine which is intended in particular for use in a motor vehicle with a hybrid drive. The intake and exhaust valves of the internal combustion engine can be actuated via a camshaft in an electrohydraulic or electromagnetic manner. In an operating phase in which the internal combustion engine is not supplied with fuel, i.e., in an overrun mode, the exhaust valves of the internal combustion engine should remain closed according to DE 10 2013 202 196 A1. This can be achieved, in particular, by disengaging a cam. At the same time, the opening of the intake valves should be adjusted in the "advanced" direction in the overrun mode compared to regular operation. This is intended both to reduce the drag torque and to protect the exhaust system of the internal combustion engine.

Possible features of operating an internal combustion engine in an overrun mode or passive mode are also described in DE 10 2016 216 116 A1, which also concerns a hybrid drive system. In this case, too, the flow of fresh air through the cylinders of the internal combustion engine should be avoided as far as possible in the overrun mode. Furthermore, the aim is for the compression work during a compression cycle and the decompression work during a decompression cycle to cancel out one another.

DE 10 2019 005 128 A1 relates to a changeover from a traction mode, i.e., combustion engine operation, of an internal combustion engine to an overrun mode. In the overrun mode, the maximum valve lift should be present at bottom dead center ±40° of crankshaft angle for both the intake valves and the exhaust valves. An electromechanical camshaft phaser is proposed for adjusting the camshafts in DE 10 2019 005 128 A1.

DE 10 2011 087 891 A1 explains a method for shutting down and restarting an internal combustion engine with an engaged torque converter lock-up clutch. DE 10 2014 224 925 A1 discloses a method for restarting an internal combustion engine in the event of its unforeseen shutdown. DE 10 2019 107 775 A1 relates to a partial compensation of the drag torque by means of an electric machine in a hybrid drive.

SUMMARY

The disclosure is based on the object of achieving progress in the operation of internal combustion engines, in particular in hybrid drive systems, wherein the change between different operating phases is to be taken into account and the aspects of fuel consumption and emission behavior, effects on the exhaust system, mechanical loads on components and the comfort-related impressions when driving are to be considered.

This object is achieved according to the disclosure by a method for operating a reciprocating piston engine. The operating method is based on a reciprocating piston engine having a valve controller and distinguishes between the following operating phases:

- a first operating phase in which the reciprocating piston engine is operated as a combustion engine, i.e., it outputs power,
- an overrun mode of the reciprocating piston engine as the second operating phase,
- a shutdown of the reciprocating piston engine, wherein its crankshaft does not necessarily come to a standstill,
- a restart of the reciprocating piston engine with the crankshaft still rotating or having been set back into rotation as the fourth operating phase, and
- a renewed transition to combustion engine operation.

During the transition from regular combustion engine operation to the overrun mode, the drag torque is reduced by adjusting the valve controller. In contrast, the drag torque is increased when the reciprocating piston engine is shut down. Finally, the drag torque is temporarily reduced in the course of the restart that aborts the shutdown process or the restart following the shutdown process before transitioning to regular combustion engine operation of indefinite duration.

Compared to conventional methods for operating internal combustion engines, in particular reciprocating piston engines, special attention is thus paid to the third and fourth phases, i.e., the shutdown process that is interrupted prior to a speed of zero being reached or that lasts until the crankshaft comes to a standstill. The restart of the internal combustion engine during shutdown, which occurs in actual driving cycles, is also referred to as a "change of mind" situation. Generally speaking, a "change of mind" situation occurs during a load demand when a shutdown of the internal combustion engine has already been initiated but the engine has not yet come to a complete standstill.

By varying the drag torque in the various operating phases, the shutdown process is, on the one hand, kept as short as possible so that a "change of mind" situation occurs as rarely as possible and if, on the other hand, the "change of mind" situation does occur, a gentle restart of the internal combustion engine is initiated.

The reduction of the drag torque in the overrun mode of the reciprocating piston engine can be achieved in particular by adjusting its intake camshaft in the "retarded" direction, starting from regular combustion engine operation. The same applies in cases where the control times of the intake valves can be adjusted in any other way. For the purpose of drag torque reduction, the intake valves can be adjusted so far that the maximum valve lift is reached approximately at bottom dead center. Even with less extreme adjustment processes, the intake camshaft can be adjusted in the "retarded" direction beyond the filling-optimal range for combustion engine operation during the transition to the overrun mode.

In particular, the exhaust valves of the reciprocating piston engine can remain completely closed during the drag torque-optimized overrun mode. This also prevents any undesirable effects of the overrun mode on the exhaust system of the reciprocating piston engine in the overrun mode. A system with which the exhaust valves can be deactivated is offered by the applicant, for example, under the designation "eRocker System". In this context, reference is made to document DE 10 2017 101 792 B4, which concerns a variable valve train.

If, starting from the overrun mode, a shutdown process takes place, for example as part of the workings of a start-stop system, the drag torque can be increased in particular by adjusting the intake camshaft phaser back to the filling-optimal range, i.e., by adjusting it in the "advanced" direction. In this regard, the exhaust valves can remain closed.

Subsequently, i.e., during the originally unplanned restart, the intake camshaft can be adjusted in the "retarded" direction beyond the filling-optimal range for combustion engine operation. The resulting reduction in resistance moment of the engine makes it possible to achieve a particularly fast, smooth start of the internal combustion engine in the "change of mind" situation, wherein the adjustment of the control times of the intake valves can already begin while the exhaust valves are still closed during the restart.

In particular, the special control times prevent unacceptably strong jerky loads on a transmission, such as a continuously variable transmission, during restart, wherein the noise characteristics are also influenced in a positive manner. This also applies to bearing components as well as traction means and tensioners, in particular belt tensioners. All in all, the non-optimized operation with regard to filling also makes it possible to restart the engine in an energy-efficient manner. Later, seamlessly following regular combustion engine operation, the valve controller is adjusted to filling-optimal control times again.

The reciprocating piston engine according to the application generally comprises a valve controller which is designed to actuate intake and exhaust valves with variable control times and/or variable lift in each case in the method according to claim 1. For example, the control times of the intake valves are continuously variable, whereas in the case of the exhaust valves, the lift can be varied in at least one stage, in particular it can be shut off. Variants are also possible in which both the control times and the lift of the intake valves and/or the exhaust valves can be changed.

In particular, the reciprocating piston engine is an internal combustion engine of a hybrid drive system of a motor vehicle. In this case, the reciprocating piston engine can comprise a starter generator designed for power input and power output via a traction means. Alternatively, a rotor of a starter generator can be connected to the crankshaft of the internal combustion engine for conjoint rotation. This variant is particularly suitable for hybrid drive systems in which the starter generator is designed to transmit higher power outputs compared to a belt-driven system.

A pendulum tensioner is particularly suitable for tensioning the traction means, in particular the belt, which is either driven by the starter generator or drives the starter generator, depending on the operating phase. One possible design of a pendulum tensioner is described, for example, in DE 10 2018 109 539 B3.

An electromechanical camshaft phaser is particularly suitable for adjusting the control times of the intake valves of the reciprocating piston engine. With such a camshaft phaser, adjustment speeds of 500° of crankshaft angle per second and more can be achieved. In this context, reference is made to DE 10 2008 050 824 A1 as an example.

Overall, the valve control method according to the application provides a so-called "smart overrun system" (SORS), which is particularly finely tuned to a wide variety of practically relevant operating phases, including a possible restart of the engine after its shutdown has already been initiated. Here, the full range of functions required in the various operating phases is provided by varying the control times. The significantly reduced mechanical loads compared to less sophisticated operating methods, in particular in changeover situations such as the so-called "change of mind" situation, not only reduce the noise development attributable to individual components, including traction means, but also contribute significantly to a long service life of the engine including its auxiliary units.

BRIEF DESCRIPTION OF THE DRAWINGS

In the following, an exemplary embodiment of the disclosure is explained in more detail with reference to drawings. In the drawings.

DETAILED DESCRIPTION

Figure 1:
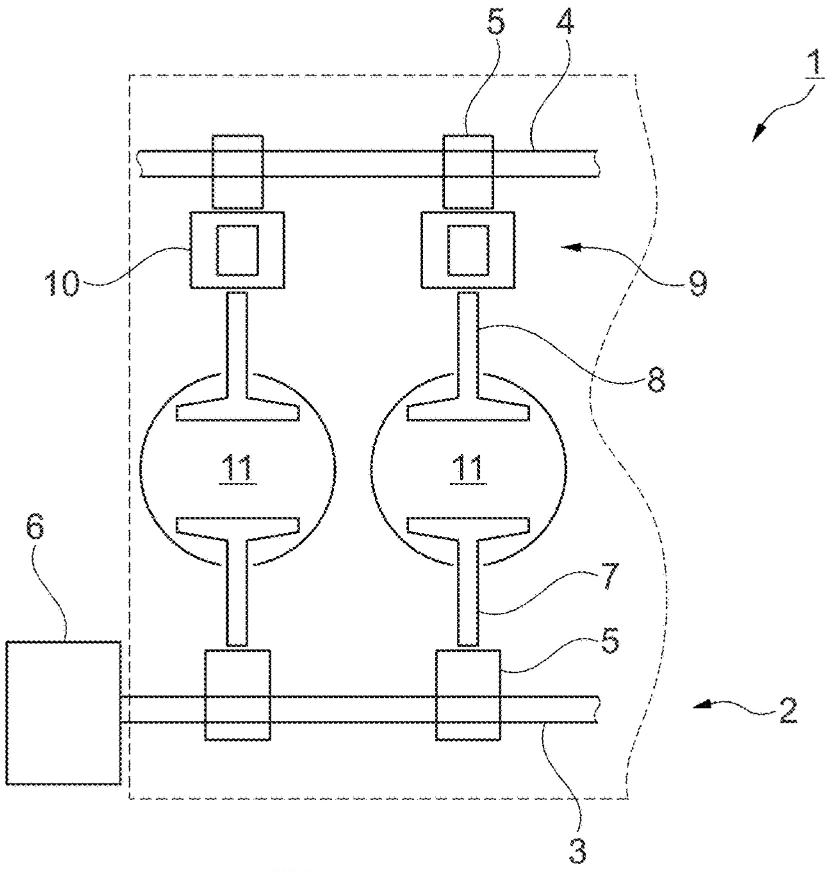
FIG. 1 shows a schematized top view of components of an internal combustion engine.

An internal combustion engine designated overall with the reference sign 1 is generally designed in a manner known per se as an inline engine with multiple cylinders 11. The internal combustion engine 1, namely a reciprocating piston engine, has a valve train designated overall with the reference sign 2. An intake-side camshaft is designated with the reference sign 3, an exhaust-side camshaft is designated with the reference sign 4. Intake-side valves 7 and exhaust-side valves 8 are actuated by cams 5. The intake-side camshaft 3 is adjustable by means of an electromechanical camshaft phaser 6. The camshaft phaser 6 operates with an actuating gear designed as a three-shaft gear. On the exhaust side, there is a shutdown device 9 of the valve train 2, with which it is possible to keep the exhaust valves 8 in their closed position. In the configuration shown in FIG. 1, the shutdown device 9 is implemented using switchable cam followers 10. The shutdown function can also be implemented using slidable cams 5.

Figure 2:
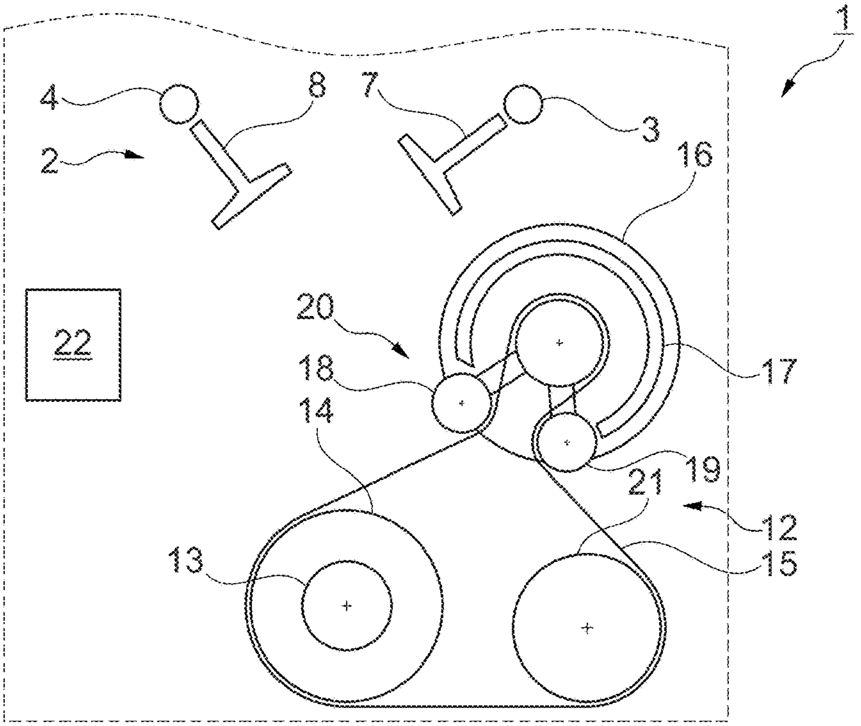
FIG. 2 shows a schematic front view of the components of the internal combustion engine shown in FIG. 1.

The reciprocating piston engine 1 has a starter generator 16, which is coupled to the crankshaft of the internal combustion engine 1, designated with the reference sign 13 in FIG. 2, via a belt drive 12, i.e., a traction drive. The belt of the traction drive 12, designated with the reference sign 15, is intended either to drive the starter generator 16 or to feed power from the starter generator 16 to the crankshaft 13, which is coupled to a belt pulley 14.

A belt tensioner of the traction drive 12 is designed as a pendulum tensioner 20 with two tensioning pulleys 18, 19 and an arc-shaped spring arrangement 17. The tensioning pulleys 18, 19 can be pivoted about the center axis of the pendulum tensioner 20 and thus also of the starter generator 16, wherein the positioning of the tensioning pulleys 18, 19 depends on the direction in which power is transmitted via the belt drive 12. A belt pulley 21 driven by the traction means 15 drives an auxiliary unit, which is an air conditioning compressor, for example.

The camshafts 3, 4 of the valve train 2 are driven by the crankshaft 13 in a manner known per se and not shown further, wherein this drive can also be affected via a traction means, in particular a chain. A control unit with which functions of the valve train 2 can be controlled is designated with the reference sign 22. The control unit 22 can also optionally implement further functions of the reciprocating piston engine 1, including the adjustment of a throttle valve (not shown). The functions of the control unit 22 can be performed by any number of components that are not necessarily spatially grouped together.

There exists a technical relationship between the settings of the valve train 2 and the forces and torques acting in the traction drive 12. The operating modes of the valve train 2 described in more detail below ensure that, in any state of the reciprocating piston engine 1, there are no impermissibly high loads within the traction drive 12, in particular in the traction means 15 itself and in the pendulum tensioner 20.

Figure 3:
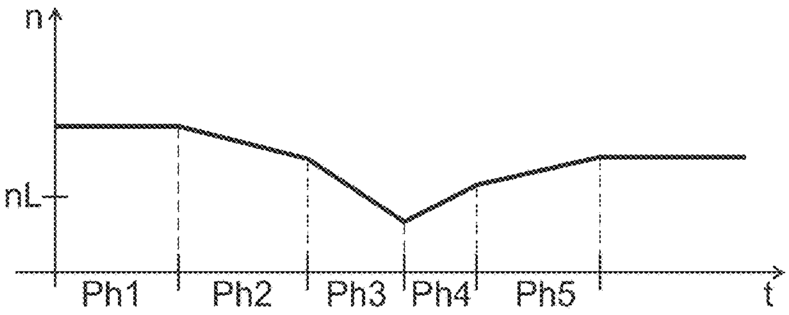
FIG. 3 shows a diagram of the course of the speed of the internal combustion engine in various operating phases.

FIG. 3 illustrates a conceivable course of the speed n of the reciprocating piston engine 1, wherein nL refers to the idle speed. In a first operating phase Ph1, the reciprocating piston engine 1 is operated as a combustion engine. This means that the crankshaft 13 outputs power, wherein the speed n is not necessarily constant in the process. The phase Ph1 is followed by an overrun mode as phase Ph2. During this operating phase Ph2, in which no fuel is burned, the speed n decreases. Subsequently, in a phase Ph3, the reciprocating piston engine 1 is intended to be shut down. In this phase 3, the speed n drops towards zero. However, in the case under consideration, the crankshaft 13 does not come to a standstill. Rather, with the crankshaft 13 still rotating, the reciprocating piston engine 1 is restarted in the phase designated Ph4. This is referred to as a "change of mind" situation. To keep the probability of such a "change of mind" situation as low as possible, the valve train 2 is adjusted in phase Ph3 in such a way that the drag torque (DT) is maximized. This corresponds to the setting E2 according to FIG. 5.

Figure 6:
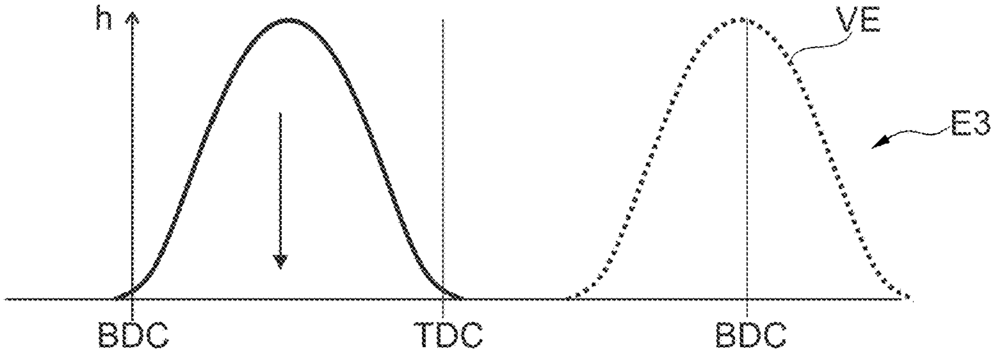

Returning to FIG. 3, in phase Ph4, the valve train 2 is adjusted such that the drag torque DT is reduced, which initially corresponds to the setting E3 according to FIG. 6. Finally, in phase Ph5, the valve controller is switched back to regular combustion engine operation, also referred to as the traction mode, by means of the control unit 22.

Figure 4:
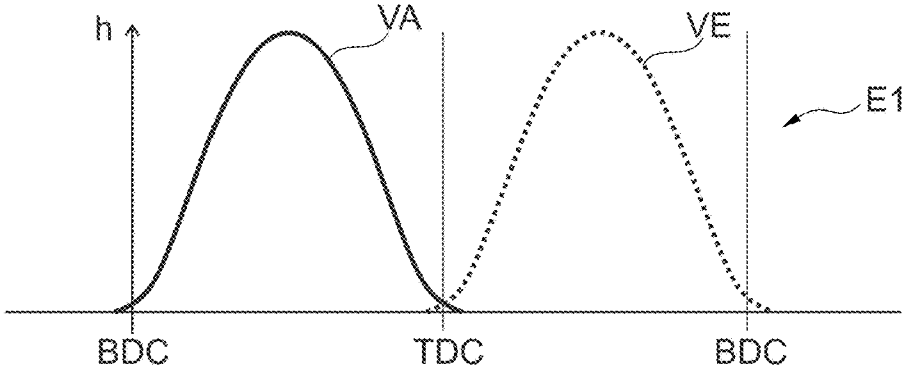
FIGS. 4 to 6 show the control times of the intake and exhaust valves of the internal combustion engine in different settings of the valve controller in one diagram each.

FIG. 4 shows valve lift curves of the intake valves 7 (VE) and the exhaust valves 8 (VA), wherein BDC refers to the bottom dead center and TDC refers to the top dead center of the reciprocating piston engine 1. The valve lift of the valve train 2 is designated with the letter h. Possibilities for varying the control times using the camshaft phaser 6 are not shown in FIG. 4. The setting of the valve train 2 in regular combustion engine operation illustrated in FIG. 4 is designated with E1.

When changing from combustion engine operation to the overrun mode, i.e., from phase Ph1 to phase Ph2, the valve train 2 changes to the setting E3 illustrated in FIG. 6. In this case, the shutdown device 9 is activated. This means that the valve lift curve VA of the exhaust valve 8, visible in FIG. 6 as well as in FIG. 4, is pushed to the zero line, as illustrated in FIG. 6 by an arrow pointing vertically downwards. This means that no gas flows through the exhaust system of the internal combustion engine 1. At the same time, as can be seen from FIG. 6, the intake valves 7 are operated at an extremely retarded position, so that the maximum lift h of the intake valves 7 is present in the region of the bottom dead center BDC.

Figure 5:
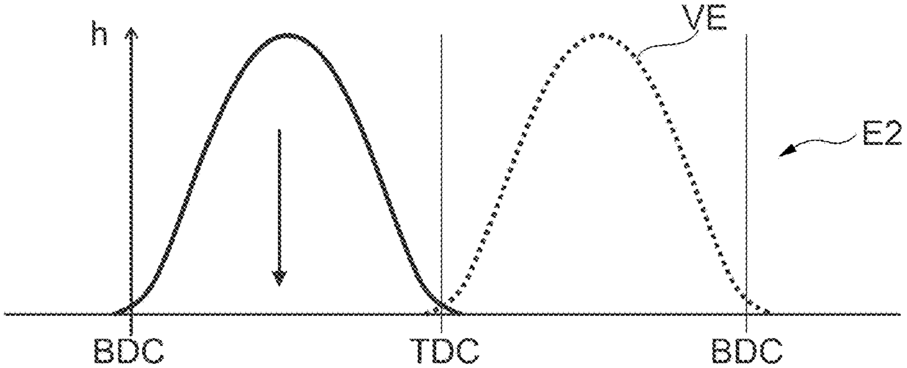

In contrast to the setting E3, in setting E2 according to FIG. 5, which refers to the third phase Ph3, i.e., an incomplete shutdown process, the operation of the reciprocating piston engine 1 is designed for maximum engine drag torque DT. In this case, the shutdown device 9 is also activated, as indicated in FIG. 5. The valve lift curve VE of the intake valve 7 is adjusted in the direction of an increased cylinder filling compared to the setting E3, which corresponds to an adjustment in the "advanced" direction.

For an explanation of the changes that take place in the valve train 2 during the restart, i.e., in phase Ph4, reference is, in turn, made to FIG. 6. The exhaust valves 8 initially remain closed, as in the setting E2. At the same time, the control times of the intake valves 8 are adjusted in the "retarded" direction, as can be seen from a comparison between FIG. 5 and FIG. 6. The resulting minimized drag torque DT facilitates the start-up of the reciprocating piston engine 1. Due to the extremely retarded position of the intake camshaft 3, the maximum lift h of the intake valves 7 is present in the region of the bottom dead center BDC. Unlike in the overrun mode, the exhaust valves 8 are to be opened during the restart, i.e., within phase Ph4 of operation of the internal combustion engine 1, such that the valve lift curve VA results, which is always shown with a solid line in FIGS. 4 to 6. Finally, phase Ph5 concerns the transition to regular combustion engine operation, i.e., to the state of the valve train 2 present in phase Ph1.

Figure 7:
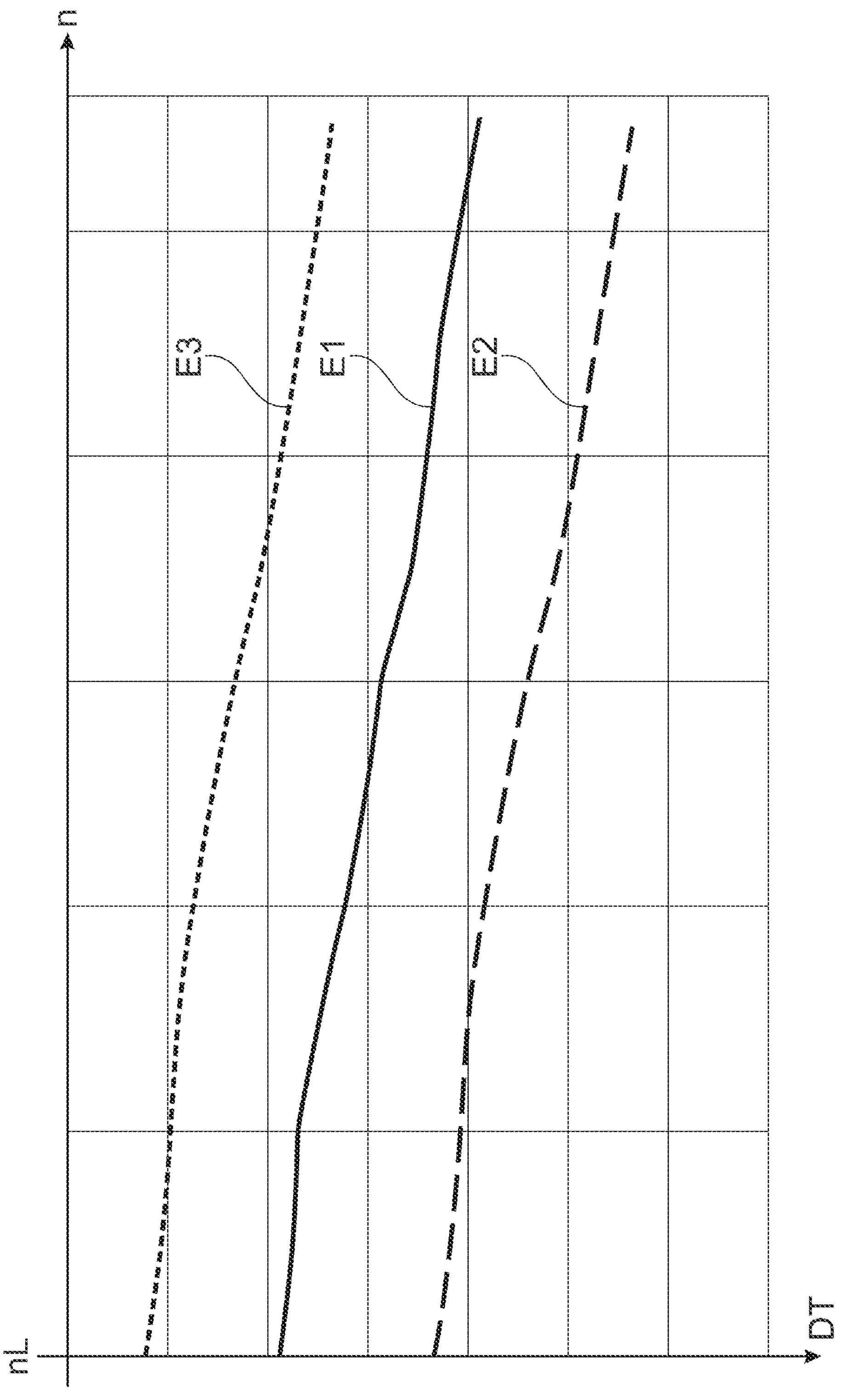
FIG. 7 shows the speed dependence of the drag torque of the internal combustion engine in the settings according to FIGS. 4 to 6 in a diagram.

FIG. 7 shows the dependence of the drag torque DT, which is to be regarded as a torque with a negative sign, on the speed n of the internal combustion engine 1 at the various settings of the control times of the gas exchange valves 7, 8, designated with E1, E2, E3. As can be seen from the diagram in FIG. 7, the lowest drag torque DT is present in the setting E3, wherein the absolute value of the drag torque DT increases approximately linearly with the speed n in the speed range shown. The corresponding dependence of the drag torque DT on the speed n also applies, in principle, to the settings E1 and E2. In all speed ranges, as far as they are visible in FIG. 7, the absolute value of the drag torque DT in the setting E2 is at least twice as large as in the setting E3. In regular combustion engine operation, i.e., in the setting E1, a drag torque DT is present which is approximately midway between the values with the settings E2 and E3.

Figure 8:
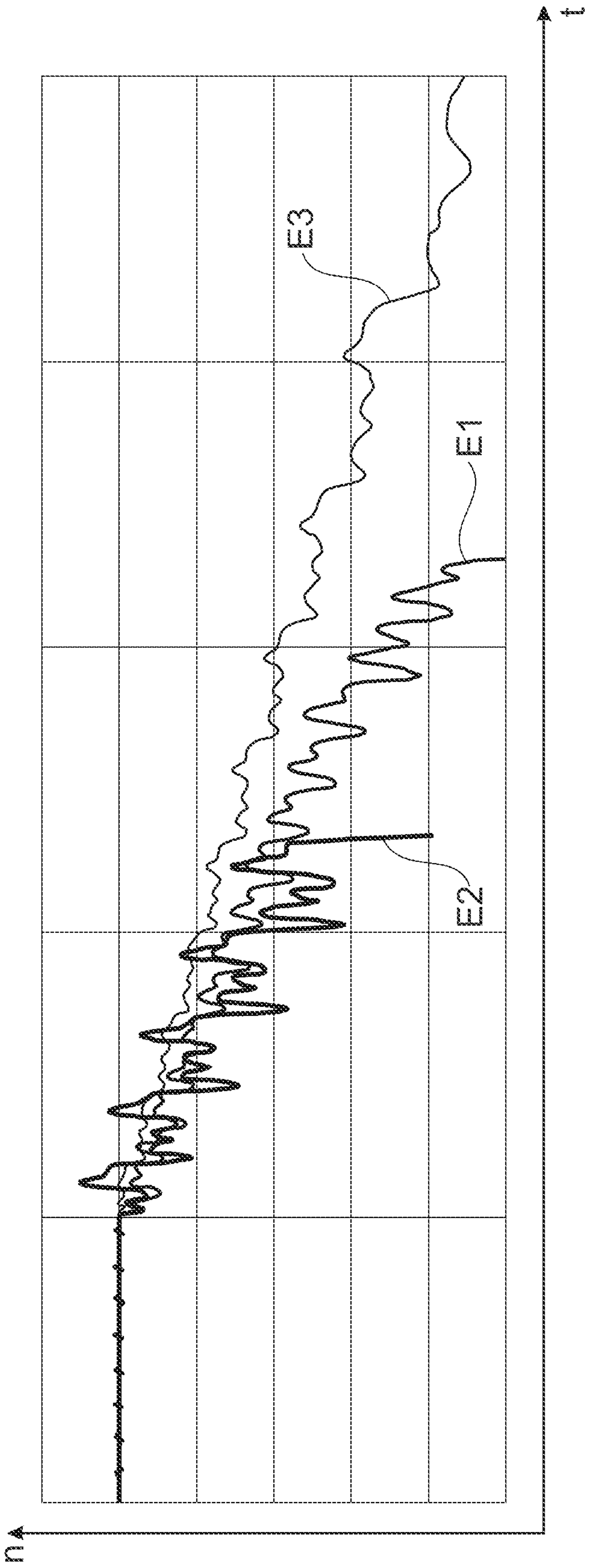
FIG. 8 shows a drop in speed of the internal combustion engine occurring during shutdown with the settings according to FIGS. 4 to 6 in a diagram.

The strong dependence of the drag torque DT on the selected setting E1, E2, E3 of the valve train 2 is also implicitly shown in the diagram in FIG. 8, which shows the drop in speed when the internal combustion engine 1 is shut down. The fastest drop in speed can be observed in the setting E2, the slowest drop in speed in the setting E3.

LIST OF REFERENCE SYMBOLS

1 Reciprocating piston engine
2 Valve train
3 Intake-side camshaft
4 Exhaust-side camshaft
5 Cam
6 Camshaft phaser
7 Valve, intake-side
8 Valve, exhaust-side
9 Shutdown device
10 Cam follower
11 Cylinder

12 Belt drive, traction drive
13 Crankshaft
14 Belt pulley
15 Traction means, belt
16 Starter generator
17 Spring arrangement
18 Tensioning pulley
19 Tensioning pulley
20 Pendulum tensioner
21 Belt pulley of an auxiliary unit
22 Control unit
BDC Bottom dead center
E1 First setting of the valve controller
E2 Second setting of the valve controller
E3 Third setting of the valve controller
DT Drag torque
n Speed
nL Idle speed
Ph1 . . . Ph5 Phase
h Valve lift
t Time
TDC Top dead center
VA Valve lift curve of the exhaust valve
VE Valve lift curve of the intake valve

The invention claimed is:

1. A method for operating a reciprocating piston engine having an electronic valve controller, the method comprising:

- operating the reciprocating piston engine as a combustion engine, defining a first operating phase,
- operating the reciprocating piston engine in an overrun mode, defining a second operating phase,
- commencing a shutdown process of the reciprocating piston engine during which an engine speed decreases, defining a third operating phase,
- aborting the shutdown process of the reciprocating piston engine prior to a engine speed of zero and restarting the reciprocating piston engine, defining a fourth operating phase, and
- transitioning to operating the reciprocating piston engine as a combustion engine, defining a fifth operating phase, wherein:
- during a transition from the first operating phase to the second operating phase, a drag torque of the reciprocating piston engine is reduced via the electronic valve controller,
- during the third operating phase, the drag torque of the reciprocating piston engine is increased, and
- during the fourth operating phase that aborts the third operating stage, the drag torque is temporarily reduced.

2. The method according to claim 1, wherein during the second operating phase, control times of intake valves of the reciprocating piston engine are adjusted in a retarded direction so as to reduce the drag torque.

3. The method according to claim 2, wherein exhaust valves of the reciprocating piston engine are shut off during the second operating phase.

4. The method according to claim 3, wherein during the fourth operating phase, adjustment of the control times of the intake valves begins while the exhaust valves remain shut off.

5. The method according to claim 3, wherein the exhaust valves are arranged on an exhaust camshaft.

6. The method according to claim 2, wherein when the shutdown process of the third operating phase is initiated, control times of the intake valves of the reciprocating piston engine are adjusted in an advanced direction and then, during the restarting of the piston engine in the fourth operating phase, the control times of the intake valves are adjusted in the retarded direction further than in the first operating phase so as to reduce the drag torque.

7. The method according to claim 6, wherein the intake valves are arranged on an intake camshaft.

8. The method according to claim 2, wherein the intake valves are arranged on an intake camshaft.

9. A reciprocating piston engine having a valve controller configured to adjust intake valves and exhaust valves with variable control times and/or variable lift in each of the five operating phases of the method according to claim 1.

10. The reciprocating piston engine according to claim 9, further comprising a starter generator configured to receive a power input and provide a power output via a traction driven.

11. The reciprocating piston engine according to claim 10, further comprising a pendulum tensioner configured for tensioning the traction drive.

12. The reciprocating piston engine according to claim 9, further comprising an electromechanical camshaft phaser configured for adjusting the variable control times of the intake valves.

13. The reciprocating piston engine according to claim 9, wherein the exhaust valves are configured to be selectively shut off.

14. A method for operating a reciprocating piston engine having intake valves, exhaust valves, and an electronic valve controller, the method comprising:

- operating the reciprocating piston engine as a combustion engine, defining a first operating phase,
- operating the reciprocating piston engine in an overrun mode, defining a second operating phase,
- commencing a shutdown process of the reciprocating piston engine during which an engine speed decreases, defining a third operating phase,
- aborting the shutdown process of the reciprocating piston engine prior to an engine speed of zero and restarting the reciprocating piston engine, defining a fourth operating phase,
- transitioning to operating the reciprocating piston engine as a combustion engine, defining a fifth operating phase, and
- during a transition from the first operating phase to the second operating phase, the exhaust valves are shut off and control times of the intake valves are adjustably retarded to a first timing,
- during the third operating phase, the exhaust valves remain shut off and the control times of the intake valves are adjustably advanced from the first timing to a second timing, and
- during the fourth operating phase that aborts the third operating stage, the exhaust valves remain shut off and the intake valve are retarded from the second timing to a third timing.

15. The method of claim 14, wherein the intake valves are arranged on an intake camshaft and the exhaust valves are arranged on an exhaust camshaft.

16. The method of claim 15, wherein the exhaust valves are shut off via switchable cam followers.

17. The method of claim 16, wherein the control times of the intake valves are adjusted via an electric camshaft phaser.

18. The method of claim 16, wherein the reciprocating piston engine further comprises a starter generator configured for restarting the reciprocating piston engine.

19. The method of claim 14, wherein the shutdown process of the reciprocating piston engine is aborted at an engine speed below idle speed.

* * * * *